(12) United States Patent
Spencer et al.

(10) Patent No.: US 7,226,570 B2
(45) Date of Patent: Jun. 5, 2007

(54) FLY ASH CONDITIONING SYSTEMS

(75) Inventors: Herbert W. Spencer, Valencia, CA (US); Ralph F. Altman, Chattanooga, TN (US)

(73) Assignee: Electric Power Research Institute, Palo Alto, CA (US)

( * ) Notice: Subject to any disclaimer, the term of this patent is extended or adjusted under 35 U.S.C. 154(b) by 642 days.

(21) Appl. No.: 10/309,364

(22) Filed: Dec. 3, 2002

(65) Prior Publication Data

US 2003/0108470 A1 Jun. 12, 2003

Related U.S. Application Data

(60) Provisional application No. 60/338,152, filed on Dec. 6, 2001.

(51) Int. Cl.
*B01D 53/52* (2006.01)

(52) U.S. Cl. .................................. 423/242.1

(58) Field of Classification Search ............ 423/242.1, 423/243.02, 243.06, 245.1, 245.2, 242.7
See application file for complete search history.

(56) References Cited

U.S. PATENT DOCUMENTS

| 3,523,407 | A | | 8/1970 | Humbert ...................... 55/106 |
|---|---|---|---|---|
| 3,665,676 | A | | 5/1972 | McKewen ........................ 55/4 |
| 4,325,713 | A | * | 4/1982 | Rosenberg et al. .... 423/243.06 |
| 5,024,171 | A | * | 6/1991 | Krigmont et al. ............ 110/345 |
| 5,051,245 | A | * | 9/1991 | Wilson et al. ............ 423/242.1 |
| 5,424,044 | A | | 6/1995 | Kalka ......................... 422/171 |
| 5,567,226 | A | * | 10/1996 | Lookman et al. ................. 95/3 |
| 5,665,142 | A | | 9/1997 | Wright ........................... 95/58 |

* cited by examiner

*Primary Examiner*—Edward M. Johnson
(74) *Attorney, Agent, or Firm*—Armstrong, Kratz, Quintos, Hanson & Brooks, LLP

(57) ABSTRACT

An algorithm process for treating fly ash found in flue gas to prevent rapping reentrainment of fly ash particles comprising adding ammonia to the fly ash particles in a stoichometric amount of one part or somewhat less of ammonia to one part of sulfur trioxide, such that rapping reentrainment of fly ash particles in the flue gas is prevented. An algorithm is used to determine the amount of sulfur in the flue gas.

10 Claims, 3 Drawing Sheets

FLY ASH CONDITIONING SYSTEMS

RELATED APPLICATIONS

Figure 1:
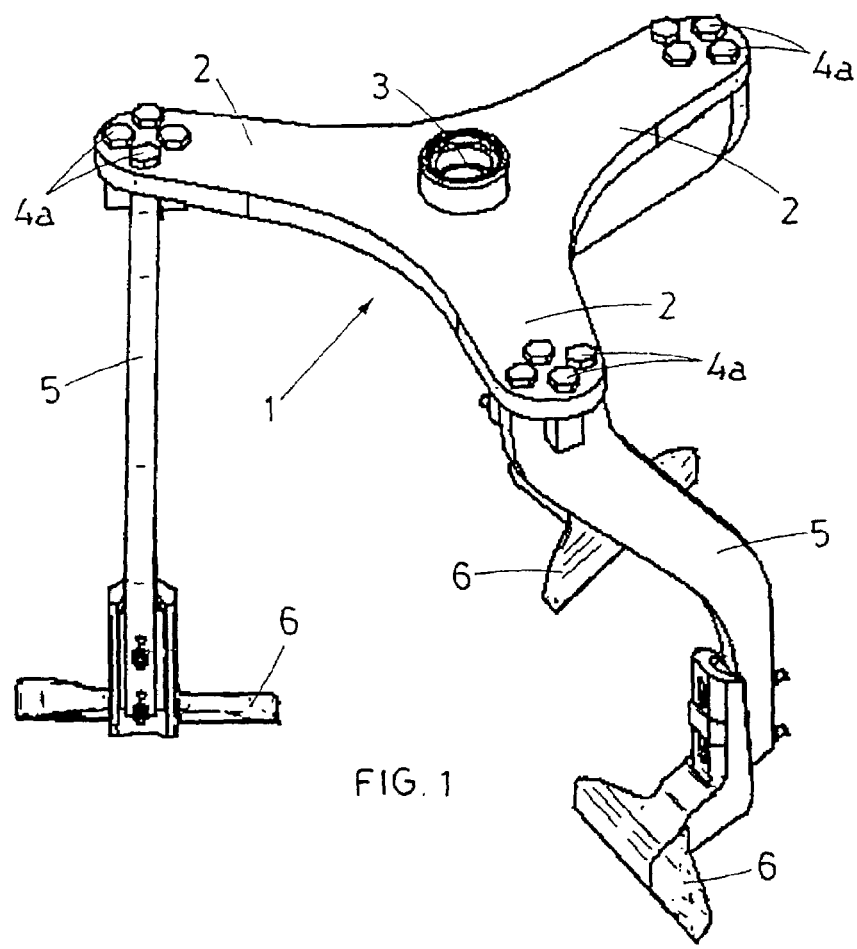
Figure 3:
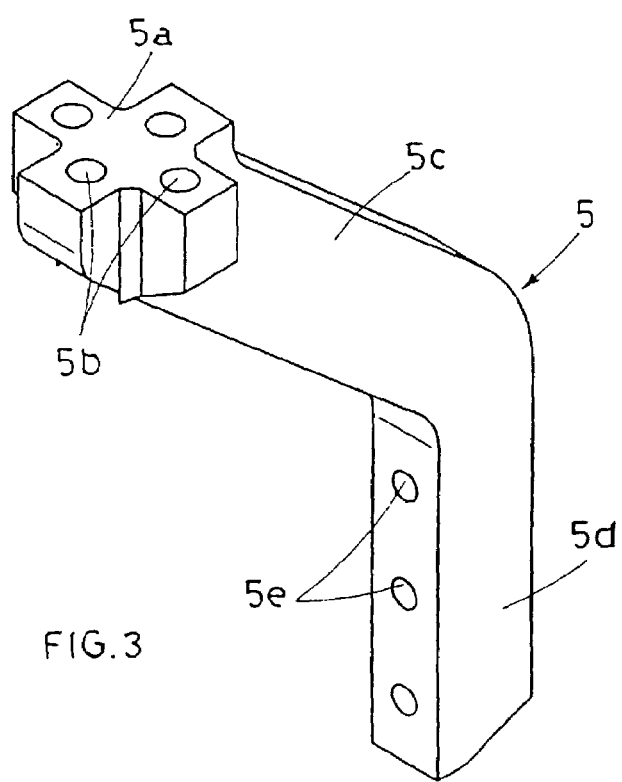
Figure 2:
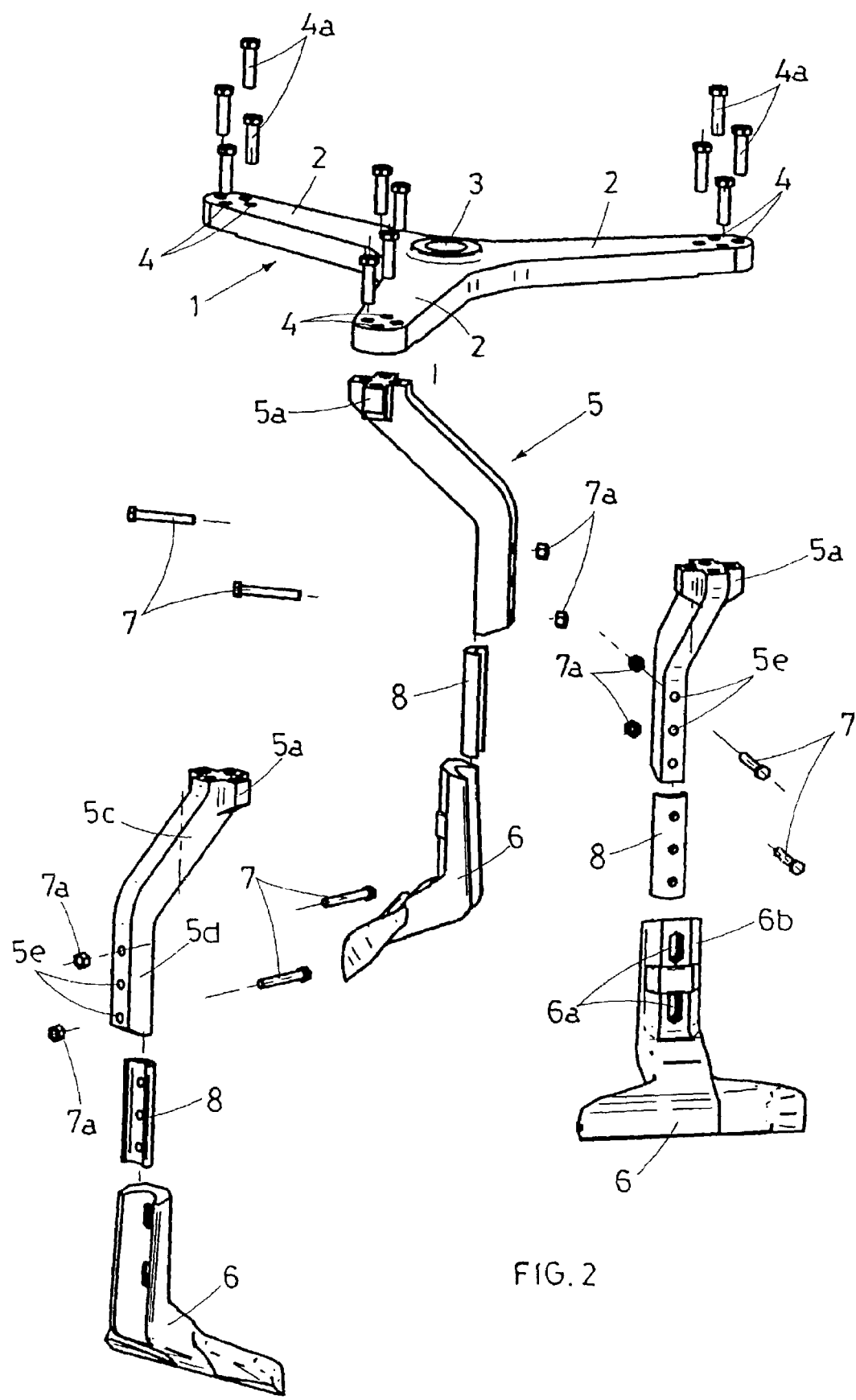
Figure 4:
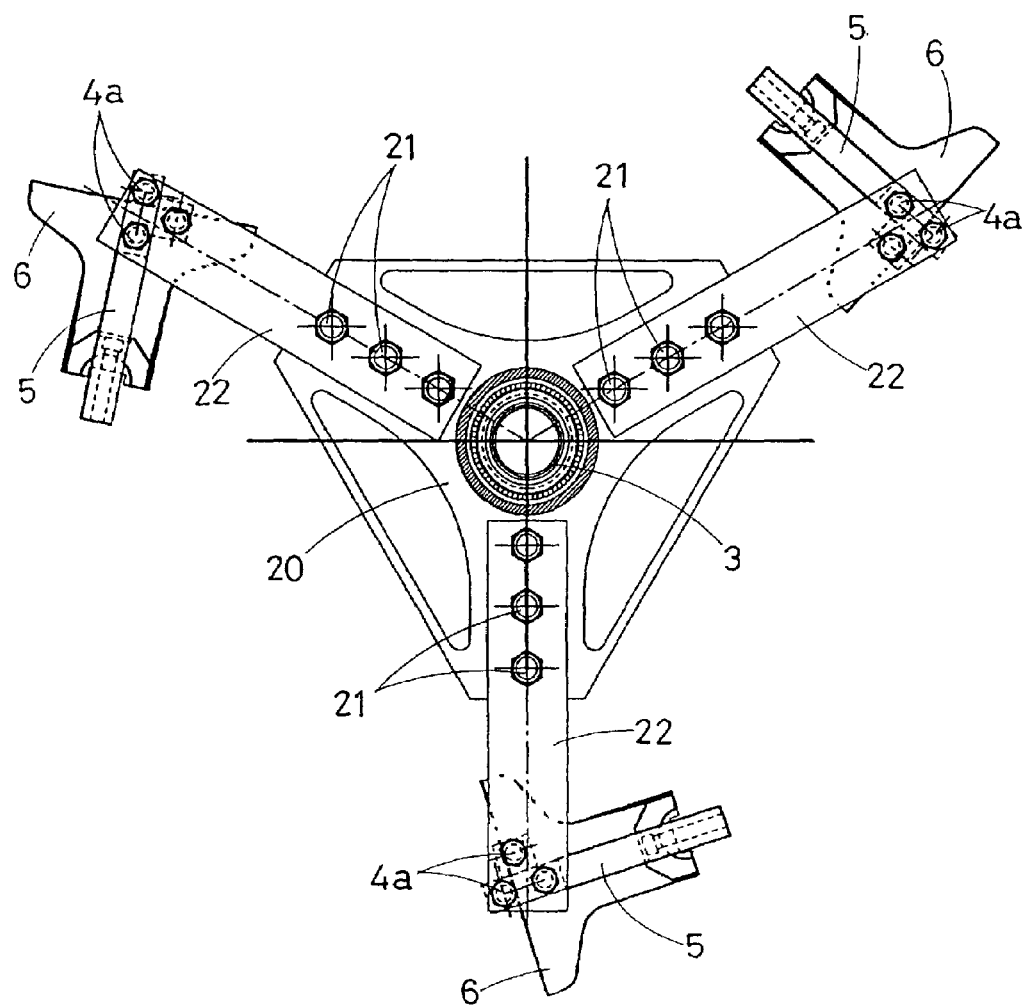

This application is related to provisional application 60/338,152, filed Dec. 6, 2001.

FIELD OF THE INVENTION

The invention finds applicability in the field of flue gas purification and pollution control. More particularly the invention is directed to fly ash removal from flue gas.

BACKGROUND OF THE INVENTION

Many utilities now burn a variety of coals at their fossil plants. This practice is growing for several reasons, including (1) the need to lower $SO_2$ emissions by burning low-sulfur coals and (2) the need to reduce fuel costs to enhance competitive position. Frequently, changes in types of coal have adverse affects on ESPs. Low-sulfur coals produce high resistivity ash that is difficult to collect in an electrostatic precipitator (the technology most commonly used to control particulate emissions from coal-fired power plants). Inexpensive coals are frequently variable in their properties and sometimes high in ash or low in sulfur or both. $SO_3$ conditioned ash, before it enters a precipitator, can lower ash resistivity and improve ESP performance. In fact, this well established technology is used at several hundred plants both here and abroad to control fly ash resistivity from low-sulfur or variable-sulfur coals.

Ammonia conditioning can be combined with $SO_3$ conditioning in difficult applications. Ammonia, injected at the proper rate, reacts with $SO_3$ (really sulfuric acid vapor) in the flue gas to produce ammonium bisulfate. This compound is liquid at typical ESP operating temperatures and produces two beneficial effects. First, it co-precipitates with the ash and increases the cohesivity of the ash, thereby reducing ash re-entrainment. This effect lowers outlet emissions due to re-entrainment, a problem that is frequently significant in small ESPs. Secondly, the presence of the ammonia compound makes certain difficult ashes easier to condition. In this country, the combination of ash from an eastern, bituminous coal and a high ESP operating temperature produces a difficult $SO_3$ conditioning situation that can be alleviated through the addition of ammonia. Ammonia conditioning systems are simple and reliable, but the controls for these systems are not sophisticated. It is important to add ammonia at the correct rate to ensure optimum ESP performance and minimum ammonia emissions.

For some fly ashes, dual conditioning with $SO_3$ and $NH_3$ can improve collection efficiency by reducing the amount of re-entrainment by producing a dust that agglomerates due to the formation of ammonium sulfate and ammonium bisulfate on the fly ash particles. Dual conditioning also increases the temperature at which $SO_3$ conditioning for ash resistivity reduction is effective.

The injection of sulfuric acid into the flue gas stream from a coal-fired boiler is used to lower the resistivity of the fly ash from coal combustion to optimize the collection of fly ash in an electrostatic precipitator. The efficiency of collection of fly ash in electrostatic precipitators is proportional to the electrical power input to the precipitator. The power input to the precipitator is proportional to the current density at which the precipitator operates. The current density at which a precipitator can be operated is directly related to the dielectric strength of the dust layer divided by the resistivity of dust layer. In general, as the dust layer resistivity decreases, the operating current density for the precipitator increases. If the dust layer resistivity is too high, then the electrical potential across the dust layer increases to the point at which the dust layer electrically breaks down forming-so-called back corona. If the dust layer resistivity is too low, the electrostatic holding force to keep the dust layer collected on the precipitator collection plates is too low. In which case the collected dust will be in re-entrained in the flue gas stream increasing emissions and reducing the efficiency of the precipitator.

Though the invention is directed mainly at fly ash collection, it is also applicable to the control of excessive $SO_3$ emissions from the conversion of $SO_2$ to $SO_3$ in a selective catalytic reactor (SCR) for $NO_x$ emission control. In the case of an SCR, ammonia is added after the air preheater in the correct portion to form ammonium bisulfate for collection in a precipitator or baghouse (fabric filter).

Prior Art Patents

Humbert (U.S. Pat. No. 3,523,407) teaches the addition of predetermined amounts of ammonia water into a particle-laden gas stream to produce ammonia bisulfate.

McKewen (U.S. Pat. No. 3,665,676) adds ammonium sulfate or ammonium bisulfate to a flue gas stream.

Kalka (U.S. Pat. No. 5,424,044) teaches a method of adding ammonia to flue gas; $SO_2$ and $SO_3$ may be present when the ammonia is added and ammonium sulfate is formed. Kalka does not teach the herein disclosed invention in that ammonium bisulfate is not disclosed as being formed. Nor is there recognition of the need to employ stoichometric amounts and nor is there recognition in Kalka that ammonium bisulfate treated fly ash will facilitate removal of fly ash from the plates of an electrostatic precipitator.

Wright (U.S. Pat. No. 5,665,142) teaches the use of ammonia in flue gas as a conditioning agent, however, the stoichometric relationship between ammonia and sulfur trioxide is not recognized, nor is the beneficial effect of reducing particle reentrainment.

Objects of Invention

An object of this invention is to produce a process wherein the removal of fly ash from flue gas is enhanced.

A further object of this invention is to enhance the effectiveness of $SO_3$ for the removal of fly ash from flue gas.

A main object of this invention is to add optimum amounts of ammonia to flue gas containing fly ash to produce enhanced fly ash adhesiveness.

A further object of this invention is the addition of optimum amounts of sulfur trioxide ($SO_3$) and ammonia to a flue gas stream, involving an electrostatic precipitator, to enhance fly ash separation from said flue gas.

These and other objects of the present invention will become apparent from a reading of the following specification.

SUMMARY OF THE INVENTION

In the electrostatic precipitation of fly ash in flue gas, rapping reentrainment of fly ash particles is a problem. The herein disclosed invention is designed to remedy this problem. The problem is solved by a method in which ammonium bisulfate is made to contact fly ash particles. That is ammonium bisulfate rather than ammonium sulfate is used to contact the fly ash. Ammonium bisulfate will produce a desired sticky product when contacting particulate fly ash. On the other hand, ammonium sulfate will product a fine particulate product which is not sticky. The use of ammonium bisulfate in the process of this invention increases cohesivity of the fly ash. This cohesivity or stickiness causes better plate adhesion.

The plates, which are generally found in multiple fields, are intended to electrostatically attract and accumulate fly ash particles present in flue gas. To rid the plates of accumulated fly ash, the plates are rapped. In the process of the herein disclosed invention, ammonium bisulfate which is sticky and adhesive causes the fly ash to adhere to the plates. When the plates are rapped, the fly ash drops off as a sheet.

Another important feature of this invention is the need for the addition of a stoichometric amount or a little less of ammonia. That is, ammonia to $SO_3$ is ideally in a ratio of 1 to 1 or a little less of ammonia.

The amount of ammonia to be added is based on the total amount of $SO_3$ present in the flue gas. This total amount of $SO_3$ is that amount of $SO_3$ inherently present due to the burning of the coal and the amount of $SO_3$ add to optimize resistivity. A method for determining the amount of $SO_3$ in flue gas can be accomplished by an algorithm. This algorithm method is an important feature of this invention.

In order to carry out the process under optimum conditions, the amount of $SO_3$ in the system has to be known so that a stoichiometric amount or a little less of ammonia is to be added. The total amount of ammonia to be added is based on the total amount of $SO_3$ in the flue gas. The total $SO_3$ would be the sum of coal combustion and/or the addition of $SO_3$ to the flue gas.

It is to be understood that while $SO_3$ has been referred to throughout this disclosure, in reality $SO_3$ is reactive with moisture ($H_2O$) to become sulfuric acid ($H_2SO_4$) vapor in the flue gas.

Optimized Ammonia System

The new ammonia conditioning system control algorithm described in this invention disclosure is based on the assumption that the optimum concentration of flue gas $SO_3$ is known. The $SO_3$ control algorithm in the companion disclosure determines this number in one of the intermediate steps. Once the flue gas $SO_3$ concentration is known, the algorithm in this invention disclosure can be used to calculate the optimum rate of ammonia addition.

This new method of controlling an ammonia conditioning system is based on the understanding of the ammonia conditioning process developed during numerous EPRI test programs. It starts with the determination of the optimum $SO_3$ flue gas concentration. Having determined the optimum $SO_3$ concentration, the rate of ammonia addition is then calculated using the following algorithm.

Step 1. Determine flue gas $SO_3$ concentration (assumed to be the optimum concentration for fly ash resistivity control).

Step 2. Multiply the $SO_3$ concentration from Step 1 by the number, n, with a value between 0.4 and 1.0. The exact value of n is determined by trial and error.

Step 3. Output the calculated value to the ammonia conditioning control system.

The above procedure is based on the finding that the addition of ammonia at a rate that produces an ammonia to $SO_3$ stoichiometry of one or less will result in the formation of the compound, ammonia bisulfate. It is this compound, which is sticky at typical ESP operating temperatures, that is responsible for its effectiveness as a conditioning agent.

More specifically, the process of this invention can be carried out by the following steps:

1. Complete a combustion calculation to determine the $SO_2$ concentration in flue gas. The measure could be; for example, parts per million (ppm) by volume in flue gas.

2a. Multiply the $SO_2$ concentration of step 1 by the number 0.004 for Eastern and Western Coals; with the exception, multiply the $SO_2$ concentration by 0.001 for Powder River Basin Coal. The resulting number is the $SO_3$ concentration in flue gas from conversion in the boiler, duct work and air heater.

2b. When an SCR (Selective Catalytic Reactor) for $NO_x$ control is present, compute the conversion of $SO_2$ to $SO_3$ from the measured or the catalysis manufacturer's supplied data. This is the additional $SO_3$ in the flue gas from catalytic oxidation of $SO_2$.

2c. Add the $SO_3$ concentration from step 2a to the $SO_3$ from step 2b. The resulting number is the $SO_3$ concentration in the flue gas.

3. Add to the number of step (2c) any $SO_3$ added to the flue gas by the $SO_3$ flue gas conditioning systems.

4. Multiply the number in step (3) by a number in the range of 0.4-0.7. This is an empirical number that compensates for the $SO_3$ adsorbed on the fly ash. Some of the $SO_3$ molecules are adsorbed on the surface of the fly ash particles. Because of this, the number of step (3) is too large by an amount depending on the chemistry of the fly ash.

Expressed another way, the new method to control an ammonia conditioning system is as follows:

Step 1. Measure certain physical and chemical parameters that characterize the operation of a process.

In this case:

a. Measure or calculate the flue gas $SO_3$ concentration. For example, the $SO_3$ concentration is determined to be 8 ppm.

b. Observe and record the instantaneous opacity of the flue gas leaving the electrostatic precipitator. This record will undoubtedly include short-term increases that are from several seconds to minutes in duration (called opacity excursions or spikes). The objective of the optimization method disclosed in this application is the minimization of the number, intensity and duration of these short-term excursions or spikes.

Regarding the opacity measurement (opacity excursions or spikes) of step (1) is a measure of fly ash particles in the flue gas. The fly ash particles in the flue gas may be due to the combination of fly ash particles in the flue gas resulting from the burning of coal plus the particles which may result from reentrainment. Spiking (indicating fly ash reentrainment) is not desired and accordingly the minimization of the spikes is desired. Minimization is accomplished by the addition of ammonia. For example the baseline opacity is at a minimum of 5%-10%, but periodically is elevated to 40%-50%. When opacity goes up somewhat, more ammonia is added.

Step 2. Mathematically adjust the value of the single parameter controlled in the calculations until a value is found that produces the desired process operation.

In this case:

Multiply the $SO_3$ concentration from Step 1 by the number, n, with a value between 0.4 and 1.0. The exact value of n is determined by an iterative process (see Step 5).

For example, choose 0.4 as the multiplier with the result that 3.2 ppm of ammonia should be added to the flue gas.

Step 3. If an SCR is present, reduce the calculated ammonia feed requirement by any ammonia slip that gets through the SCR and air preheater.

Step 4. Using the measured or calculated gas flow, convert ammonia concentration to an ammonia feed rate.

Step 5. Physically set the controlled parameter to the value identified in Step 4.

In this case:

Output the calculated value to the ammonia conditioning control system

For example, a control signal would be sent to the ammonia conditioning system that would cause this system to add ammonia to the flue gas at a rate that would add ammonia at a rate that would produce a concentration of 3.2 ppm.

Step 4. Repeat the Step 1 measurements to verify that the process is operating in the desired manner.

In this case:

Observe and record the opacity of the flue gas leaving the ESP. The number of opacity excursions or spikes should have diminished. If significant spikes still persist, increase that factor used to determine the rate of ammonia addition.

For example, use the factor 0.6 in Step 2 to determine that 4.8 ppm should be added to the flue gas. Repeat Step 3 with this new value and then repeat Step 4 until a satisfactory opacity record in produced.

All current ammonia conditioning system controls inject ammonia at a preset rate that is moderated only by unit load. The algorithm in this invention disclosure improves on this process by selecting a rate of ammonia addition that will optimize ESP performance even if the $SO_3$ concentration in the flue gas changes. The $SO_3$ concentration at plants that burn variable coal supplies, a common occurrence, does vary considerably; hence, the new algorithm is superior to current control processes which are insensitive to the flue gas $SO_3$ concentration.

This new control process can be applied to any ammonia conditioning system. These systems are in use at approximately twenty domestic utility plants.

The technical support for this control process comes from field tests and laboratory studies of ammonia conditioning conducted by EPRI. Data from these tests demonstrated that ammonia injected at a rate that produces a molar concentration of ammonia that is equal to, or less than, the molar concentration of sulfuric acid vapor in the flue gas will result in the formation of ammonium bisulfate. It was further demonstrated that ammonium bisulfate co-precipitates with fly ash onto ESP collection plates, increases the cohesivity of fly ash on the plates and thereby reduces re-entrainment.

Sulfur Trioxide ($SO_3$) and Ammonia ($NH_3$) System

As part of the disclosed invention, there is a process depending on an algorithm wherein optimum amounts of $SO_3$ as well as ammonia are added to the flue gas stream in order to enhance the removal by the electrostatic precipitator of flue gas particles. As illustrated in Appendix A. Broadly considered, the algorithm is used to calculate the optimum amount of $SO_3$ to be added to the flue gas after which the derived value for optimum $SO_3$ is inputted to derive by an algorithm the optimum amount of ammonia to be added. Stated another way, once the optimum concentration of $SO_3$ has been determined by algorithm an optimum amount of ammonia is determined by algorithm. In this way, optimum amounts of $SO_3$ and ammonia can be added to the flue gas stream to properly condition fly ash particles. The algorithm for determining the amount of $SO_3$ to be added is set forth in detail in the accompanying Appendix A, attached as part of the specification disclosure.

In this invention optimized injection of $SO_3$ is obtained by continually monitoring the boiler load, boiler heat rate or the coal feed rate, the temperature of the flue gas, $SO_2$ content of the flue gas, and precipitator transformer/rectifier secondary currents and then using these variables to compute an optimum $SO_3$ injection rate. See Addition A.

The procedure is to first calculate the actual flow of flue gas to the precipitator based on the burn rate of coal in the boiler, which is either calculated from the boiler load and boiler heat rate or measured by the coal feed rate. Alternatively, where a stack gas flow measurement is available, the measured flue gas flow rate can be used and converted to actual cubic feet per minute of flue gas Addition A For example, representative numbers for these parameters are as follows:

| | |
|---|---|
| boiler load: | 150 mw (from plant instrumentation) |
| boiler head rate: | 10,000 Btu/mwhr (from plant test data) |
| flue gas temperature: | 291° F. (from plant instrumentation) |

-continued

| | |
|---|---|
| flue gas $SO_2$ concentration: | 880 ppm (from calculation) |
| precipitator currents: | from (ESP instrumentation) |

| | transformer 1 | transformer 2 | transformer 3 | transformer 4 |
|---|---|---|---|---|
| Field 1 | 165 ma | 165 ma | 165 ma | 165 ma |
| Field 2 | 224 ma | 224 ma | 224 ma | 224 ma |
| Field 3 | 274 ma | 274 ma | 274 ma | 274 ma |
| Field 4 | 338 ma | 338 ma | 338 ma | 338 ma | flow for the temperature and pressure conditions at the inlet of the precipitator. The $SO_2$ to concentration in the flue gas stream is then determined by either a coal combustion calculation or by direct measurement at the stack by means of a continuous emission monitoring system (CEMS). A conversion factor is then used to estimate the $SO_3$ concentration in the flue gas based on the $SO_2$ concentration. The conversion factor is a function of the ash chemistry, the boiler configuration and composition of boiler components. In this invention the conversion factor can either by manually inputted or automatically selected based on the chemistry of fly ash. The chemistry the fly ash is either manually provided to the computation program or where available, measured online in real-time and provided to the computation program. See Addition B. When an SCR is present, a second conversion factor is used to compute the conversion of $SO_2$ to $SO_3$ in the SCR. The $SO_3$ from normal boiler conversion is added to the $SO_3$ from the SCR conversion to get the total $SO_3$ in the flue gas.

The next step is to input a desired operating resistivity or current density. The current density inputted is converted to an effective resistivity using correlations of current density and resistivity developed under EPRI project WO629 and included in EPRI report CS-5040. Precipitator Performance Estimation Procedure. The required $SO_3$ concentration in ppm is computed by using an inversion of the Roy Bickelhaupt resistivity calculation procedure for modification of ash resistivity by $SO_3$. The Beckelhaupt equation (calculation) is included in EPRI Report CS-4145. A Manual on the Use of the Gas Conditioning for ESP Performance Enhancement. A discussion of the computer code for performing this procedure is attached. Once the required $SO_3$ is determined for the selected ash resistivity, it is compared with the estimated flue gas $SO_3$ computed above. If the required $SO_3$ Addition B For example, the coal and ash chemistry for the example case is as follows:

| Example Coal Composition As Received Ultimate Analysis % | | Example Fly Ash Composition % | |
|---|---|---|---|
| Carbon | 68.00 | $LiO_2$ | 0.01 |
| Hydrogen | 3.86 | $Na_2$ | 0.96 |
| Oxygen | 6.00 | $K_2O$ | 2.43 |
| Nitrogen | 1.00 | MgO | 0.78 |
| Sulfur | 2.20 | CaO | 2.62 |

-continued

| Example Coal Composition As Received Ultimate Analysis % | | Example Fly Ash Composition % | |
|---|---|---|---|
| Moisture | 3.60 | $Fe_2O_3$ | 7.76 |
| Ash | 16.34 | $Al_2O_3$ | 17.85 |
| SUM | 100.00 | $SiO_2$ | 61.00 |
| | | $TiO_2$ | 0.62 |
| | | $P_2O_5$ | 0.55 |
| | | $SO_3$ | 2.43 |
| | | SUM | 97.01 |

For this coal and ash, the appropriate $SO_2$ to $SO_3$ conversion factor is 0.004, so the estimated $SO_3$ concentration is:

0.00088×0.004=3.52 ppm

Addition C

For the example, the inherent $SO_3$ concentration is estimated to be 3.52 ppm and the needed or required concentration is estimated using the Bechlehaupt equation to be 7.33 ppm. Hence, it would be necessary to add 3.81 ppm to the flue gas.

is less than the estimated $SO_3$, no $SO_3$ injection is needed. If the required $SO_3$ is greater than the estimated flue gas $SO_3$ from the coal, then $SO_3$ injection is needed. The amount of $SO_3$ injection needed is the equal to difference between the amount of $SO_3$ in the flue gas from the conversion of coal sulfur to $SO_3$ and that required to condition the fly ash to achieve a high current density in the precipitator and agglomeration. See Addition C.

The additional $SO_3$ in ppm is converted to $SO_3$ injection in pounds per hour based on the measured or calculated flue gas flow rate. Procedures for this step are attached. The $SO_3$ injection rate in pounds per hour is then converted to a sulfur feed rate adjusted to include the conversion efficiency of sulfur to sulfur trioxide ($SO_3$) in the $SO_3$ supply system. The conversion rate is often a function of the sulfur feed rate. In this procedure, adjustments can be made to correct for the changes in conversion efficiency. Heat balance measurements for the $SO_3$ supply system can be used to calculate the conversion efficiency. The sulfur feed rate is then converted to a desired output to control the $SO_3$ supply system. Typical outputs are in units of sulfur gallons per hour, pump rate gallons per hour, or pump percent of maximum rating.

Optimization of the sulfur feed rate is obtained by adjustments of either the selected resistivity set point or the selected operating current density set point. See Addition D.

A refinement to procedure that can adjust for variations in coal chemistry is to compute an effective dynamic resistivity based on the precipitator measured secondary currents and voltages. If the dynamic resistivity is less or greater than the desired set point, a proportional adjustment is made to create a new set point to be used for the $SO_3$ injection calculation. Because of the delayed response time of precipitators to the injection of $SO_3$, a time delay that can be adjusted to select an appropriate delay for making the correction is used. Using this procedure, the set point is periodically adjusted to correct for variations in ash chemistry. Typically, ash chemistry will vary at Addition D In this example case, the optimum resistivity is chosen to $1.0 \times 10^{10}$ ohm-cm. The corresponding current densities would be:

| Field 1 | 27.67 na/cm² |
| Field 2 | 33.50 na/cm² |
| Field 3 | 39.08 na/cm² |
| Field 4 | 41.02 na/cm² |

Addition E

In this example case, the ESP transformer current given earlier can be converted to current densities by dividing by the plate area energized by each transformer. The result of this procedure yield the following numbers:

| | transformer 1 | transformer 2 | transformer 3 | transformer 4 |
|---|---|---|---|---|
| Field 1 | 9.13 na/cm² | 9.13 na/cm² | 9.13 na/cm² | 9.13 na/cm² |
| Field 2 | 12.41 na/cm² | 12.41 na/cm² | 12.41 na/cm² | 12.41 na/cm² |
| Field 3 | 15.19 na/cm² | 15.19 na/cm² | 15.19 na/cm² | 15.19 na/cm² |
| Field 4 | 18.73 na/cm² | 18.73 na/cm² | 18.73 na/cm² | 18.73 na/cm² |

These current densities correspond to the following estimated fly ash resistivities:

| Field 1 | $9.1 \times 10^{10}$ ohm-cm |
| Field 2 | $10.4 \times 10^{10}$ ohm-cm |
| Field 3 | $11.3 \times 10^{10}$ ohm-cm |
| Field 4 | $11.8 \times 10^{10}$ ohm-cm |

The resistivities in this example were calculated using the inverted form of the equations found in EPRI report CS-5040. Precipitator Performance Estimation Procedure.

a much slower rate than the fluctuations in coal sulfur content, boiler load, and gas temperature. In this invention the correction procedure is an optional calculation. See Addition E.

An additional refinement to the procedure is to use the total flue gas $SO_3$ ($SO_3$ from flue gas $SO_3$ from conversion of $SO_2$ in a SCR, and $SO_3$ from injection) as the control basis for the injection of $NH_3$ for precipitators using dual conditioning with $SO_3$ and $NH_3$. In this case, the ammonia concentration in ppm is set at a ratio of the total $SO_3$, for example 0.5 times the total $SO_3$. The ratio factor can be programmed to be selected by an operator and can be set to scale as a function of load and gas temperature. The required factor is reduced if there is any ammonia slip to the precipitator from ammonia injection to control $NO_x$ in a SCR. Often additional $NH_3$ is needed with higher temperatures to cause the $SO_3$ to form a conductive layer on the fly ash. The $NH_3$ concentration is converted to a feed rate by multiplying the flue gas flow rate determined by combustion calculations or by flue gas flow measurements. A control output in mass per time or as a percent of maximum supply is computed and provided to the ammonia supply system to adjust the ammonia feed rate.

Often the flue gas flow rate and temperature vary across the face of the inlet duct to a precipitator. In particular, there are temperature variations due to the air pre-heater. By either measuring the flow and temperature or by using ratios that reflect the variations in the duct flow and temperature, the $SO_3$ required for each section of the duct can be computed using the same procedure as above. In this case, each section is treated separately and the $SO_3$ and $NH_3$ feed for each section are computed. The total required feed for each component is determined by summing the feeds for each section. The ratio of the feeds for each section to the total feed for each component are then computed and used to control valves to ratio the feed to each section of the duct. By using this procedure, over and under conditioning can be avoided resulting in a reduction in precipitator emissions.

Referring to Appendix A:

Invention I (Procedure with no ESP Feedback)
1. "Typical" Starting Conditions:
    low flue gas $SO_3$ concentration measured at the ESP inlet—0 to 4 ppm $SO_3$—example number=3.5.
    moderate to high fly ash resistivity—$8\times10^{10}$ (8×10E10) ohm-cm to $5\times10^{12}$ (5×10E12) ohm-cm.
    low ESP power level characterized by low average current densities—see Table 1. Appendix A.
B. Desired "End" Conditions:
    increased flue gas $SO_3$ measured at ESP inlet—from 2 to 12 ppm, depending on flue gas temperature and fly ash composition.
    optimum fly ash resistivity—$8\times10^9$ (8×10E9) ohm-cm to $4\times10^{10}$ (4×10E10) ohm-cm, depending on ESP collection and reentrainment characteristics, example $1\times10^{10}$ ohm-cm.
    high ESP power levels as indicated by current density levels—again, see Table 1. Appendix A.
C. Calculation (invention) to determine the level of $SO_3$ injection needed to produce optimum fly ash resistivity and, hence, optimum level of flue gas $SO_3$.
    Step 1.
    1. Determine the temperature of the flue gas entering the ESP from plant instrumentation, example=291° F.
    2. Obtain coal proximate the ultimate analysis and fly ash mineral analysis, see Table 2.
    Step 2.
    Estimate $SO_3$ background level of $SO_3$ in the flue gas using correlation relating flue gas $SO_3$ to coal type and coal sulfur content. The $SO_3$ concentration is calculated as a percentage of $SO_2$ in flue gas which can be determined from a combustion calculation using the coal analysis and flue gas $O_2$ or $CO_2$ or if the flue gas $SO_2$ is available from plant instruments, this number can be used in the $SO_3$ calculation.
    See Calculation 1 and Calculation 2.
    Step 3.
    Calculate the base ash resistivity using empirical equations relating ash resistivity to ash composition, flue gas moisture and flue gas temperature. The Bickelhaupt equations are an example of relationships that can be used for this calculation.
    See Calculation 3 and Calculation 4.
    Step 4.
    Use a correlation relating the base fly ash resistivity and flue gas $SO_3$ concentration to determine the flue gas $SO_3$ concentration needed to produce the optimum fly ash resistivity. Examples of correlation relating base fly ash resistivity and flue gas $SO_3$ to actual resistivity are procedures given by Bickelhaupt and by McCain. See Calculation 5.
    Step 5.
    Subtract the background $SO_3$ concentration from the needed $SO_3$ concentration from the needed $SO_3$ that must be added to the flue gas to produce the optimum fly ash resistivity. See Calculation 6.
    Step 6.
    Send rate of addition signal to the controls that operate the $SO_3$ conditioning system.

Referring to Appendix A:

Invention II (Procedure with ESP Feedback)
1. "Typical" Starting Conditions:
    low flue gas $SO_3$ concentration measured at the ESP inlet—0 to 4 ppm $SO_3$—example number=3.5.
    moderate to high fly ash resistivity—$8\times10^{10}$ (8×10E10) ohm-cm to $5\times10^{12}$ (5×10E12) ohm-cm.
    low ESP power level characterized by low average current densities—see Table 1. Appendix A.
B. Desired "End" Conditions:
    increased flue gas $SO_3$ measured at ESP inlet—from 2 to 12 ppm, depending on flue gas temperature and fly ash composition.
    optimum fly ash resistivity—$8\times10^9$ ohm-cm to $4\times10^{10}$ ohm-cm, depending on ESP collection and reentrainment characteristics—example number $1\times10^{10}$ ohm-cm.
    high ESP power levels as indicated by current density levels—again, see Table 1. Appendix A.
3. Calculation (invention) to determine the level of $SO_3$ injection needed to produce optimum fly ash resistivity and, hence, optimum level of flue gas $SO_3$.
    Step 1.
    Obtain coal proximate and ultimate analysis and fly ash mineral analyses—example case, see Table 2.
    Step 2.
    Determine the temperature of the flue gas entering the ESP from plant instrumentation, example number 291° F.
    Step 3.
    Estimate $SO_3$ background level of $SO_3$ in the flue gas using correlation relating flue gas $SO_3$ to coal type and coal sulfur content. See Calculations 1 and 2.
    Step 4.
    Measure the current levels in each field of the ESP and calculate the corresponding current densities. See Calculation 3.
    Step 5.
    Determine effective fly ash resistivity level in the ESP using a correlation that relates fly ash resistivity to ESP current density for each electrical field in the direction of gas flow. Average the results to produce an average resistivity for the ESP. If this resistivity is close to or lower than the optimum range, go to Step 10, otherwise proceed to Step 6. See Calculation 4.
    Step 6.
    Use a correlation relating fly ash composition and flue gas temperature and $SO_3$ concentration to fly ash resistivity to determine the flue gas $SO_3$ concentration needed to produce the optimum fly ash resistivity. See Calculations 5, 6 and 7.
    Step 7.
    Subtract the background $SO_3$ concentration from Step 3 from the needed $SO_3$ concentration from Step 6 to determine the amount of $SO_3$ that must be added to the flue gas to produce the optimum fly ash resistivity. See Calculation 8.
    Step 8.
    Send rate of addition signal to the controls that operate the $SO_3$ conditioning system.
    Step 9.
    Repeat Steps 4 and 5.
    Step 10.
    1. If indicated ash resistivity is equal to or less than optimum resistivity, decrease rate of injection by x percent where x is between 5 and 25.

Or
b. If indicated ash resistivity is greater than optimum resistivity, increase rate of injection of x percent where x is between 5 and 25.

Step 11.

Repeat Step 10 until indicated fly ash resistivity passes through optimum resistivity point and then set rate of injection at a point in the range bounded by the levels calculated at a point that is halfway between the two levels.

Step 12.

Every y minutes, where y is number between 5 and 30, restart the process beginning at Step 2

Obviously, many modifications may be made without departing from the basic spirit of the present invention. Accordingly, it will be appreciated by those skilled in the art that within the scope of the appended claims, the invention may be practiced other than has been specifically described herein.

APPENDIX A

Invention I (Procedure With No ESP Feedback)

1. "Typical" Starting Conditions:
   a. Low flue gas $SO_3$ concentration measured at the ESP inlet – 0 to 4 ppm $SO_3$ – example number = 3.5
   b. Moderate to high fly ash resistivity – $8 \times 10^{10}$ ohm-cm to $5 \times 10^{12}$ ohm-cm
   c. Low ESP power level characterized by low average current densities. See attached Table 1.

2. Desired "End" Conditions:
   a. Increased flue gas $SO_3$ measured at ESP inlet – from 2 to 12 ppm, depending on flue gas temperature, flue gas moisture, and fly ash composition.
   b. Optimum fly ash resistivity – $8 \times 10^9$ ohm-cm to $4 \times 10^{10}$ ohm-cm, depending on ESP collection and reentrainment characteristics – example number $1 \times 10^{10}$ ohm-cm
   c. High ESP power levels as indicated by current density levels. See Table 1.

3. Calculation (invention) to determine the level of $SO_3$ injection needed to produce optimum fly ash resistivity and, hence, optimum level of flue gas $SO_3$ Step 1
   Determine the temperature of the flue gas entering the ESP from plant instrumentation.
   Example number = 291°F. Obtain coal proximate and ultimate analyses and fly ash mineral analyses.
   See Table 2

Step 2
   Estimate $SO_3$ background level in the flue gas using correlation relating flue gas $SO_3$ to coal type and coal sulfur content. The $SO_3$ concentration is calculated as a percentage of $SO_2$ in flue gas which can be determined from a combustion calculation using the coal analysis and flue gas $O_2$ or $CO_2$ or if the flue gas $SO_2$ is available from plant instruments, this number can be used in the $SO_3$ calculation..
   See Calculation 1 and Calculation 2.

Step 3
   Calculate the base ash resistivity using empirical equations relating ash resistivity to ash composition, flue gas moisture and flue gas temperature. The Bickelhaupt equations are an example of relationships that can be used for this calculation. See Calculation 3 and Calculation 4.

Step 4
   Use a correlation relating the base fly ash resistivity and flue gas $SO_3$ concentration to determine the flue gas $SO_3$ concentration needed to produce the optimum fly ash resistivity. Examples of correlation relating base fly ash resistivity and flue gas $SO_3$ to actual resistivity are procedures given by Bickelhaupt and by McCain. See Calculation 5.

Step 5
   Subtract the background $SO_3$ concentration from the needed $SO_3$ concentration from the needed $SO_3$ that must be added to the flue gas to produce the optimum fly ash resistivity. See Calculation 6.

Step 6
   Send rate of addition signal to the controls that operate the $SO_3$ conditioning system.

Table 1
Typical Per-Field Current Densities for a Range of Resistivities

| | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm*cm) | CURRENT na/cm$^2$ | CURRENT na/cm$^2$ | CURRENT na/cm$^2$ | CURRENT na/cm$^2$ | CURRENT na/cm$^2$ |
| 1.00E+10 | 27.67 | 33.50 | 39.08 | 41.02 | 48.08 |
| 2.00E+10 | 19.82 | 24.84 | 29.41 | 32.40 | 38.96 |
| 4.00E+10 | 14.20 | 18.42 | 22.12 | 25.59 | 31.57 |
| 6.00E+10 | 11.68 | 15.46 | 18.73 | 22.29 | 27.91 |
| 8.00E+10 | 10.17 | 13.66 | 16.64 | 20.21 | 25.58 |
| 1.00E+11 | 9.13 | 12.41 | 15.19 | 18.73 | 23.90 |
| 2.00E+11 | 6.54 | 9.20 | 11.43 | 14.79 | 19.36 |
| 4.00E+11 | 4.69 | 6.82 | 8.60 | 11.68 | 15.69 |
| 6.00E+11 | 3.86 | 5.73 | 7.28 | 10.18 | 13.87 |
| 8.00E+11 | 3.36 | 5.06 | 6.47 | 9.23 | 12.71 |
| 1.00E+12 | 3.02 | 4.59 | 5.90 | 8.55 | 11.88 |
| 2.30E+12 | 2.02 | 3.21 | 4.19 | 6.44 | 9.23 |
| 4.00E+12 | 1.55 | 2.53 | 3.34 | 5.33 | 7.80 |
| 6.00E+12 | 1.27 | 2.12 | 2.83 | 4.65 | 6.90 |
| 8.00E+12 | 1.11 | 1.87 | 2.51 | 4.21 | 6.32 |
| 1.00E+13 | 1.00 | 1.70 | 2.29 | 3.90 | 5.90 |

Note: Resistivities and current densities above the line are in the range that will produce optimum ESP performance. Resistivities and current densities below the line are in the range that will produce suboptimum ESP performance Table 2

| Example Coal Composition As Received Ultimate Analysis (%) | | Example Fly Ash Composition As Constituents (%) | |
|---|---|---|---|
| Carbon | 68.00 | $LiO_2$ | 0.01 |
| Hydrogen | 3.86 | $Na_2O$ | 0.96 |
| Oxygen | 6.00 | $K_2O$ | 2.43 |
| Nitogen | 1.00 | $MgO$ | 0.78 |
| Sulfur | 2.20 | $CaO$ | 2.62 |
| Moisture | 3.60 | $Fe_2O_3$ | 7.76 |
| Ash | 16.34 | $Al_2O_3$ | 17.85 |
| SUM | 100.00 | $SiO_2$ | 61.00 |
| | | $TiO_2$ | 0.62 |
| | | $P_2O_5$ | 0.55 |
| | | $SO_3$ | 2.43 |
| | | SUM | 97.01 |

Calculation 1

Calculation of Flue Gas Composition

A. Calculation of combustion products, air, and $O_2$ for 100% combustion.

| Coal Constituent | Ultimate analysis lb/100 lb fuel | | Molecular weight | | Moles per 100 lb fuel | | Multipliers[1] | Required for combustion Moles/100 lb fuel at 100% total air | |
|---|---|---|---|---|---|---|---|---|---|
| | | | | | | | | $O_2$ | Dry Air |
| C | 68.00 | ÷ | 12.01 | = | 5.662 | x | 1.0 and 4.76 | 5.662 | 26.951 |
| $H_2$ | 3.86 | ÷ | 2.02 | = | 1.911 | x | 0.50 and 2.38 | 0.956 | 4.548 |
| $O_2$ | 6.00 | ÷ | 32.00 | = | 0.188 | x | −1.00 and −4.76 | −0.188 | −0.895 |
| $N_2$ | 1.00 | ÷ | 28.01 | = | 0.036 | | | | |
| S | 1.20 | ÷ | 32.06 | = | 0.037 | x | 1.00 and 4.76 | 0.037 | 0.176 |
| $H_2O$ | 3.60 | ÷ | 18.02 | = | 0.200 | | | | |
| Ash | 16.34 | | − | | | | | | |
| Sum | 100.00 | | | | 8.034 | | | 6.467 | 30.780 |

B. Calculation of air and $O_2$ for 30% excess air (typical excess air level).

| | Required for Combustion moles/100 lb fuel at 30% excess air | |
|---|---|---|
| | $O_2$ | Dry air |
| $O_2$ and air x 130/100 total | 8.407 | 40.014 |
| Excess air = 40.014 − 30.780 | - | 9.234 |
| Excess $O_2$ = 8.407 − 6.467 | 1.940 | - |

Calculation 1 (continued)

C. Calculation of flue gas composition.

Products of Combustion

| Flue gas Constituent | Combustion/Fuel/Air | Total moles/100 lb fuel | % by volume wet basis | % by volume dry basis |
|---|---|---|---|---|
| $CO_2$ | 5.662 = | 5.662 | 13.406 | 14.412 |
| $H_2O$ | 1.911 + 0.200 + 0.838$^a$ = | 2.949 | 6.983 | - |
| $SO_2$ | 0.037 = | 0.037 | 0.088 | 0.094 |
| $N_2$ | 0.036 + 31.611$^b$ = | 31.647 | 74.931 | 80.555 |
| $O_2$ | 1.940 = | 1.940 | 4.593 | 4.938 |
| Sum wet | | 42.235 | | |
| Sum dry = 42.235 - 2.949 | | 39.286 | | |

--- a. Moles $H_2O$ in air = (40.014 × 29 × 0.013) ÷ 18 = 0.838 b. Moles $N_2$ in air = (40.014 × 0.79) = 31.611

Calculation 2

Background SO3 Calculation

From Calculation 1, the $SO_2$ concentration dry (the resistivity concentration in this example uses the equivalent $SO_3$ concentration of "dry" flue gas) is equal to 0.094%. The appropriate $SO_2$ to $SO_3$ conversion factor for this coal is 0.4% so the approximate $SO_3$ concentration is:

$$0.00094 \times 0.004 = 3.76 \text{ PPM (dry basis)}$$

Note: The flue gas $SO_2$ concentration can be obtained from the plant's Continuous Emissions Monitoring (CEM) system, corrected for flue gas moisture concentration using factors from the combustion calculation in Table 2 and multiplied by the factor 0.004 to estimate to inherent or background $SO_3$ concentration.

Calculation 3
Atomic Percent Calculation

Note: Bickelhaupt equation requires the cationic percent of certain elements so the calculation starts as follows. Conversion of Weight Percent Analysis of Ash to Molecular Percent as Oxides and Cationic Percent Step 1: Normalize the weight percentages to sum 100% by dividing each specified percentage by the sum of the specified percentages.

Step 2: Divide each oxide percentage by the respective molecular weight to obtain the mole fractions.

Step 3: Divide each mole fraction by the sum of the mole fractions and multiply by 100 to obtain the molecular percentages as oxides.

Step 4: Multiply each molecular percentage by the decimal fraction of cations in the given oxide to obtain the atomic concentrations.

| Oxide | Specified Weight % | Normalized Weight % | Molecular Weight | Mole Fraction | Molecular Percentage | Cationic Fraction | Atomic Concentration Of Cation |
|---|---|---|---|---|---|---|---|
| $Li_2O$ | 0.01 | 0.01 | 29.88 | 0.00034 | 0.024 | 0.67 | 0.016 |
| $Na_2O$ | 0.96 | 0.99 | 61.98 | 0.01600 | 1.116 | 0.67 | 0.744 |
| $K_2O$ | 2.43 | 2.50 | 94.20 | 0.02654 | 1.854 | 0.67 | 1.236 |
| MgO | 0.78 | 0.80 | 40.31 | 0.01985 | 1.387 | 0.50 | 0.694 |
| CaO | 2.62 | 2.70 | 56.08 | 0.04815 | 3.364 | 0.50 | 1.682 |
| $Fe_2O_3$ | 7.76 | 8.00 | 159.70 | 0.05009 | 3.500 | 0.40 | 1.400 |
| $Al_2O_3$ | 17.85 | 18.40 | 101.96 | 0.18046 | 12.608 | 0.40 | 5.043 |
| $SiO_2$ | 61.00 | 62.89 | 60.09 | 1.04660 | 73.123 | 0.33 | 24.368 |
| $TiO_2$ | 0.62 | 0.64 | 79.90 | 0.00801 | 0.560 | 0.33 | 0.186 |
| $P_2O_5$ | 0.55 | 0.57 | 141.94 | 0.00402 | 0.281 | 0.29 | 0.080 |
| $SO_3$ | 2.43 | 2.50 | 80.06 | 0.03123 | 2.183 | 0.25 | 0.546 |
| Sum | 97.01 | 100.00 | | 1.43129 | 100.000 | | |

Calculation 4

Starting Resistivity Calculation

Using the % atomic concentrations from Calculation 3, use the following equations for calculation of fly ash resistivity (Bickelhaupt equations).

$$\rho_v = \exp[-1.8916 \ln X - 0.9696 \ln Y + 1.234 \ln Z + 3.62876 - (0.069078)E + 9980.58/T]$$

$$\rho_s = \exp[27.59774 - 2.233348 \ln X - (0.00176)W - (0.069078)E - (0.00073895)(W) \exp(2303.3/T)]$$

$$\rho_a = \exp[85.1405 - (0.708046) CSO_3 - 23267.2/T - (0.069078)E],$$

for $z < 3.5\%$ or $K > 1.0\%$ $$\rho_a = \exp[59.0677 - (0.854721) CSO_3 - 13049.47/T - (0.069078)E],$$

for $z > 3.5\%$ and $K < 1.0\%$ $$1/\rho_{vs} = 1/\rho_v + 1/\rho_s$$

$$1/\rho_{vsa} = 1/\rho_{vs} + 1/\rho_a$$

$\rho_v$ = volume resistivity (ohm-cm)

$\rho_s$ = surface resistivity (ohm-cm)

$\rho_a$ = adsorbed acid resistivity (ohm-cm)

$\rho_{vs}$ = volume and surface resistivity (ohm-cm)

$\rho_{vsa}$ = total resistivity (ohm-cm)

X = Li+Na   percent atomic concentration

Y = Fe   percent atomic concentration

Z = Mg+Ca   percent atomic concentration

Calculation 4 (continued)

K = K  percent atomic concentration

T = absolute temperature (K)

W = moisture in flue gas (volume %)

$CSO_3$ = concentration of $SO_3$ (ppm, dry)

E = applied electric field (kV/cm)

For the example case,

X = 0.016 + 0.744 = 0.76

Y = 1.40

Z = 0.694 + 1.682 = 2.376

K = 1.236

T = 417 (Example gas temperature 291°F.)

W = 6.983

$CSO_3$ = (from Calculation 2) 3.76 ppm, dry

E = 10 (typical electric field value)

$\rho_v$ = exp [ -1.8916 ln (0.76) - 0.9696 ln (1.40) + 1.237 ln (2.376)

+ 3.62876 - (0.069078) (10) + 9980.58/417]

= 1.636 x $10^{12}$ ohm-cm $\rho_s$ = exp [27.59774 - 2.23348 ln (0.76) - (0.00176) (6.983)

- (0.069078) (10) - (0.00073895) (6.983) exp (2303.0/417)]

Calculation 4 (continued)

$$= 2.392 \times 10^{11} \text{ ohm-cm}$$

$$\rho_a = \exp[85.1405 - (0.708046)(3.76) - 23267.2/417 - (0.069078)(10)]$$

$$= 1.939 \times 10^{11} \text{ ohm-cm}$$

$$1/\rho_{vs} = 1/1.636 \times 10^{12} + 1/2.392 \times 10^{11} = 4.792 \times 10^{-12}$$

$$\rho_{vs} = 2.1 \times 10^{11} \text{ ohm-cm}$$

$$1/\rho_{vsa} = 1/4.792 \times 10^{-12} + 1/1.939 \times 10^{11} = 9.949 \times 10^{-12}$$

$$\rho_{vsa} = 1.0 \times 10^{11} \text{ ohm-cm}$$

Calculation 5

From Calculation 4, $$1/\rho_{vsa} = 1/\rho_{vs} + 1/\rho_a$$

where $\rho_{vsa} = 1 \times 10^{10}$ ohm-cm (the desirable $\rho$)

$\rho_{vs} = 2.1 \times 10^{11}$ ohm-cm (from Calculation 4)

$1/\rho_a = 1/\rho_{vsa} - 1/\rho_{vs}$ $= 1.0 \times 10^{10} - 2.761905 \times 10^{12}$ $= 9.5238 \times 10^{11}$ $\rho_{va} = 1.05 \times 10^{10}$ ohm-cm also from Calculation 4, $$\rho_a = \exp[85.1405 - (0.708046)CSO_3 - 23267.2/T - (0.069078)E]$$

where T = 417 (from Calculation 4)

E = 10 (from Calculation 4)

hence $1.05 \times 10^{10} = \exp[85.1405 - (0.708046)CSO_3$ $- 23267.2/417 - (0.069078)(10)]$ $\ln(1.05 \times 10^{10}) = 85.1405 - (0.708046)CSO_3 - 55.79664 - 0.69078$ $23.07464109 = 28.652 - (0.708046)CSO_3$ Calculation 5 (continued)

$(0.708046)\, CSO_3 = 5.578$ $CSO_3 = 7.878$

Correcting to wet conditions $SO_3$ needed $= 7.878 \times (39.286/42.235)$ $= 7.33$ ppm

Calculation 6

Rate of $SO_3$ Addition Calculation $SO_3$ from combustion calculation, Calculation 1, and background calculation, Calculation 2, = 0.00088 x 0.004 = 3.52 ppm (wet basis)

See Calculation 5 for desireable $SO_3$ level = 7.33 ppm

Difference = 7.33 − 3.52 = 3.81 ppm

Output to $SO_3$ control system

= 3.81 ppm

Invention II (Procedure With ESP Feedback)

2. "Typical" Starting Conditions:
   * Low flue gas $SO_3$ concentration measured at the ESP inlet – 0 to 4 ppm $SO_3$ - example number = 3.5
   * Moderate to high fly ash resistivity – $8 \times 10^{10}$ ohm-cm to $5 \times 10^{12}$ ohm-cm
   * Low ESP power level characterized by low average current densities
   See attached table.

2. Desired "End" Conditions:
   * Increased flue gas $SO_3$ measured at ESP inlet – from 2 to 12 ppm, depending on flue gas temperature, flue gas moisture, and fly ash composition.
   * Optimum fly ash resistivity – $8 \times 10^9$ ohm-cm to $4 \times 10^{10}$ ohm-cm, depending on ESP collection and reentrainment characteristics – example number $1 \times 10^{10}$ ohm-cm
   * High ESP power levels as indicated by current density levels.
   See Table 1.

3. Calculation (invention) to determine the level of $SO_3$ injection needed to produce optimum fly ash resistivity and, hence, optimum level of flue gas $SO_3$ Step 1
   Obtain coal proximate and ultimate analyses and fly ash mineral analyses.
   Example case, see Table 2.

Step 2
   Determine the temperature of the flue gas entering the ESP from plant instrumentation.
   Example number 291°F.

Step 3
   Estimate $SO_3$ background level in the flue gas using correlation relating flue gas $SO_3$ concentration to coal type and coal sulfur content.
   See Calculations 1 and 2.

Step 4
   Measure the electric current levels in each field of the ESP and calculate the corresponding current densities. See Calculation 3.

Step 5
   Determine effective fly ash resistivity level in the ESP using a correlation that relates fly ash resistivity to ESP current density for each electrical field. Average the results to produce an effective resistivity for the ESP. If this resistivity is close to, or lower than, the optimum range, go to Step 10, otherwise proceed to Step 6. See Calculation 4.

Step 6
Use a correlation relating fly ash composition and flue gas temperature and $SO_3$ concentration to fly ash resistivity to determine the flue gas $SO_3$ concentration to needed to produce the optimum fly ash resistivity. See Calculations 5, 6, and 7.

Step 7
Subtract the background $SO_3$ concentration from Step 3 from the needed $SO_3$ concentration from Step 6 to determine the amount of $SO_3$ that must be added to the flue gas to produce the optimum fly ash resistivity.
See Calculation 8.

Step 8
Send rate of additional signal to the controls that operate the $SO_3$ conditioning system.

Step 9
Repeat Steps 4 and 5.

Step 10
a. If indicated ash resistivity is equal to or less than optimum resistivity, decrease rate of injection by x percent where x is between 5 and 25.
Or b. If indicated ash resistivity is greater than optimum resistivity, increase rate of injection by x percent where x is between 5 and 25.

Step 11
Repeat Step 10 until indicated fly ash resistivity passes through optimum resistivity point and then set rate of injection at a point in the range bounded by the levels calculated in the last two interactions
- for example, at a point that is halfway between the two levels.

Step 12
Every y minutes, where y is number between 5 and 30, restart the process beginning at Step 2.

Table 1

Typical Per-Field Current Densities for a Range of Resistivities

| | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm*cm) | CURRENT na/cm$^2$ | CURRENT na/cm$^2$ | CURRENT na/cm$^2$ | CURRENT na/cm$^2$ | CURRENT na/cm$^2$ |
| 1.00E+10 | 27.67 | 33.50 | 39.08 | 41.02 | 48.08 |
| 2.00E+10 | 19.82 | 24.84 | 29.41 | 32.40 | 38.96 |
| 4.00E+10 | 14.20 | 18.42 | 22.12 | 25.59 | 31.57 |
| 6.00E+10 | 11.68 | 15.46 | 18.73 | 22.29 | 27.91 |
| 8.00E+10 | 10.17 | 13.66 | 16.64 | 20.21 | 25.58 |
| 1.00E+11 | 9.13 | 12.41 | 15.19 | 18.73 | 23.90 |
| 2.00E+11 | 6.54 | 9.20 | 11.43 | 14.79 | 19.36 |
| 4.00E+11 | 4.69 | 6.82 | 8.60 | 11.68 | 15.69 |
| 6.00E+11 | 3.86 | 5.73 | 7.28 | 10.18 | 13.87 |
| 8.00E+11 | 3.36 | 5.06 | 6.47 | 9.23 | 12.71 |
| 1.00E+12 | 3.02 | 4.59 | 5.90 | 8.55 | 11.88 |
| 2.30E+12 | 2.02 | 3.21 | 4.19 | 6.44 | 9.23 |
| 4.00E+12 | 1.55 | 2.53 | 3.34 | 5.33 | 7.80 |
| 6.00E+12 | 1.27 | 2.12 | 2.83 | 4.65 | 6.90 |
| 8.00E+12 | 1.11 | 1.87 | 2.51 | 4.21 | 6.32 |
| 1.00E+13 | 1.00 | 1.70 | 2.29 | 3.90 | 5.90 |

Note: Resistivities and current densities above the line are in the range that will produce optimum ESP performance. Resistivities and current densities below the line are in the range that will produce suboptimum ESP performance Table 2

| Example Coal Composition As Received Ultimate Analysis (%) | | Example Fly Ash Composition As Constituents (%) | |
|---|---|---|---|
| Carbon | 68.00 | $LiO_2$ | 0.01 |
| Hydrogen | 3.86 | $Na_2O$ | 0.96 |
| Oxygen | 6.00 | $K_2O$ | 2.43 |
| Nitogen | 1.00 | $MgO$ | 0.78 |
| Sulfur | 2.20 | $CaO$ | 2.62 |
| Moisture | 3.60 | $Fe_2O_3$ | 7.76 |
| Ash | 16.34 | $Al_2O_3$ | 17.85 |
| SUM | 100.00 | $SiO_2$ | 61.00 |
| | | $TiO_2$ | 0.62 |
| | | $P_2O_5$ | 0.55 |
| | | $SO_3$ | 2.43 |
| | | SUM | 97.01 |

Calculation 1

Calculation of Flue Gas Composition

A. Calculation of combustion products, air, and $O_2$ for 100% combustion.

| Coal Constituent | Ultimate analysis lb/100 lb fuel | | Molecular weight | | Moles per 100 lb fuel | | Multipliers[1] | Required for combustion Moles/100 lb fuel at 100% total air | |
|---|---|---|---|---|---|---|---|---|---|
| | | | | | | | | $O_2$ | Dry Air |
| C | 68.00 | ÷ | 12.01 | = | 5.662 | x | 1.0 and 4.76 | 5.662 | 26.951 |
| $H_2$ | 3.86 | ÷ | 2.02 | = | 1.911 | x | 0.50 and 2.38 | 0.956 | 4.548 |
| $O_2$ | 6.00 | ÷ | 32.00 | = | 0.188 | x | -1.00 and -4.76 | -0.188 | -0.895 |
| $N_2$ | 1.00 | ÷ | 28.01 | = | 0.036 | | | | |
| S | 1.20 | ÷ | 32.06 | = | 0.037 | x | 1.00 and 4.76 | 0.037 | 0.176 |
| $H_2O$ | 3.60 | ÷ | 18.02 | = | 0.200 | | | | |
| Ash | 16.34 | | – | | – | | | | |
| Sum | 100.00 | | | | 8.034 | | | 6.467 | 30.780 |

C. Calculation of air and $O_2$ for 30% excess air (typical excess air level).

| | Required for Combustion moles/100 lb fuel at 30% excess air | |
|---|---|---|
| | $O_2$ | Dry air |
| $O_2$ and air x 130/100 total | 8.407 | 40.014 |
| Excess air = 40.014 – 30.780 | - | 9.234 |
| Excess $O_2$ = 8.407 - 6.467 | 1.940 | - |

Calculation 1 (continued)

C. Calculation of flue gas composition.

Products of Combustion

| Flue gas Constituent | Combustion/Fuel/Air | | Total moles/100 lb fuel | % by volume wet basis | % by volume dry basis |
|---|---|---|---|---|---|
| $CO_2$ | 5.662 | = | 5.662 | 13.406 | 14.412 |
| $H_2O$ | 1.911 + 0.200 + 0.838[a] | = | 2.949 | 6.983 | - |
| $SO_2$ | 0.037 | = | 0.037 | 0.088 | 0.094 |
| $N_2$ | 0.036 + 31.611[b] | = | 31.647 | 74.931 | 80.555 |
| $O_2$ | 1.940 | = | <u>1.940</u> | 4.593 | 4.938 |
| Sum wet | | | 42.235 | | |
| Sum dry = 42.235 - 2.949 | | | 39.286 | | |

--- a. Moles $H_2O$ in air = (40.014 x 29 x 0.013) ÷ 18 = 0.838 c. Moles $N_2$ in air = (40.014 x 0.79) = 31.611

Calculation 2

Background $SO_3$ Calculation

From Calculation 1, the $SO_2$ concentration dry (the resistivity concentration in this example uses the equivalent $SO_3$ concentration of "dry" flue gas) is equal to 0.094%. The appropriate $SO_2$ to $SO_3$ conversion factor for this coal is 0.4% so the approximate $SO_3$ concentration is:

$$0.00094 \times 0.004 = 3.76 \text{ PPM (dry basis)}$$

Note: The flue gas $SO_2$ concentration can be obtained from the plant's Continuous Emissions Monitoring (CEM) system, corrected for flue gas moisture concentration using factors from the combustion calculation in Table 2 and multiplied by the factor 0.004 to estimate to inherent or background $SO_3$ concentration.

Calculation 3

Example Precipitator 4 electrical fields in the direction of gas flow

Each electrical field has four transformer/rectifier sets.

Each transformer/rectifier set energized 19,440 ft$^2$ of plate area.

Readings from the transformer/rectifier sets are as follows:

|         | TR1    | TR2    | TR3    | TR4    |
|---------|--------|--------|--------|--------|
| Field 1 | 165 ma | 165 ma | 165 ma | 165 ma |
| Field 2 | 224 ma | 224 ma | 224 ma | 224 ma |
| Field 3 | 274 ma | 274 ma | 274 ma | 274 ma |
| Field 4 | 338 ma | 338 ma | 338 ma | 338 ma |

For a typical field, these current densities translate in current densities as follows:

165 ma × (1.0×10$^{-3}$ ma/a)/(19,440 ft$^2$) = 8.488×10$^{-6}$ a/ft$^2$ = 8.488 μa/ft$^2$ 8.488×10$^{-6}$ × 1.076 = 9.133 na/cm$^2$

Note: 1.0 μa/ft$^2$ = 1.076 na/cm$^2$

Similar calculations can be used to produce the following table

|         | TR1   | TR2   | TR3   | TR4   |
|---------|-------|-------|-------|-------|
| Field 1 | 9.13  | 9.13  | 9.13  | 9.13  |
| Field 2 | 12.41 | 12.41 | 12.41 | 12.41 |
| Field 3 | 15.19 | 15.19 | 15.19 | 15.19 |
| Field 4 | 18.73 | 18.73 | 18.73 | 18.73 |

Where the units are na/cm$^2$

Notice that in this example, all of the TR sets in the same field have been assumed to have the same operating point, i.e. the same voltage and current levels. If these numbers were different, an averaging process, in Step 5, would be used to deal with this more common situation.

Calculation 4

EPRI Derived Resistivity/Current Density Equators

Field 1     $\log_{10} (J, nA/cm^2) = (6.455 \pm 0.370) - 0.5013 \log_{10} (\rho, ohm\text{-}cm)$
Field 2     $\log_{10} (J, nA/cm^2) = (6.839 \pm 0.360) - 0.5214 \log_{10} (\rho, ohm\text{-}cm)$
Field 3     $\log_{10} (J, nA/cm^2) = (5.497 \pm 0.304) - 0.3905 \log_{10} (\rho, ohm\text{-}cm)$
Field 4     $\log_{10} (J, nA/cm^2) = (5.718 \pm 0.327) - 0.4005 \log_{10} (\rho, ohm\text{-}cm)$
Field 5     $\log_{10} (J, nA/cm^2) = (3.328 \pm 0.306) - 0.1736 \log_{10} (\rho, ohm\text{-}cm)$ Where J is in $nA/cm^2$ and $\rho$ is in ohm-cm
but
$J = 10^{\log(J)} = e^{\ln(J)} = [10^{\log(e)}]^{\ln(J)} = 10^{\log(e)\ln(J)}$
so
$\underline{\log(J) = \log(e) \ln(J)}$
but
$10^{\log(e)} = e$
$[e^{\ln(10)}]^{\log(e)} = e$
$e^{\ln(10)\log(e)} = e$
$\ln(10)\log(e) = \ln(e)$
$\log(e) = \ln(e)/\ln(10)$
       $= 1/\ln(10)$ or $\underline{\log(e) = 1/\ln(10)}$
substitution gives:
$\log(J) = \log(e)\ln(J) = \ln(J)/\ln(10) = \ln(J)/2.302585$
similarly,
$\log(\rho) = \ln(\rho)/\ln(10) = \ln(\rho)/2.302585$
further substitution gives:

Field 1     $\ln(J)/\ln(10) = 6.455 - 0.5013 \ln(\rho)/\ln(10)$
or         $\ln(J) = 2.302585 \times 6.455 - 0.5013 \ln(\rho)$
Field 1     $\ln(J) = 14.8632 - 0.5013 \ln(\rho)$
similarly
Field 2     $\ln(J) = 15.74738 - 0.5214 \ln(\rho)$
Field 3     $\ln(J) = 12.65731 - 0.3905 \ln(\rho)$
Field 4     $\ln(J) = 13.16618 - 0.4005 \ln(\rho)$
Field 5     $\ln(J) = 7.66300 - 0.1736 \ln(\rho)$

Calculation 4 (continued)

The EPRI equations are inverted to give the following:

| | |
|---|---|
| Field 1 | $\ln(\rho) = 29.64931 - 1.994813 \ln(J)$ |
| Field 2 | $\ln(\rho) = 30.20211 - 1.917913 \ln(J)$ |
| Field 3 | $\ln(\rho) = 32.41309 - 2.560819 \ln(J)$ |
| Field 4 | $\ln(\rho) = 32.87435 - 2.496879 \ln(J)$ |
| Field 5 | $\ln(\rho) = 44.14171 - 5.76037 \ln(J)$ |

From Calculation 3, we have the following:

| | J |
|---|---|
| Field 1 | 9.13 na/cm$^2$ |
| Field 2 | 12.41 na/cm$^2$ |
| Field 3 | 15.19 na/cm$^2$ |
| Field 4 | 18.73 na/cm$^2$ |

Using the $\rho$ vs. J equation gives:

| | $\rho$ |
|---|---|
| Field 1 | $9.1 \times 10^{10}$ ohm-cm |
| Field 2 | $10.4 \times 10^{10}$ ohm-cm |
| Field 3 | $11.3 \times 10^{10}$ ohm-cm |
| Field 4 | $\underline{16.2 \times 10^{10}}$ ohm-cm |
| Average | $11.8 \times 10^{10}$ ohm-cm |

Note that the resistivity is much higher than the optimum value of $10^{10}$ ohm-cm.

Calculation 5
Atomic Percent Calculation

Note: Bickelhaupt equation requires the cationic percent of certain elements so the calculation starts as follows. Conversion of Weight Percent Analysis of Ash to Molecular Percent as Oxides and Cationic Percent Step 1: Normalize the weight percentages to sum 100% by dividing each specified percentage by the sum of the specified percentages.

Step 2: Divide each oxide percentage by the respective molecular weight to obtain the mole fractions.

Step 3: Divide each mole fraction by the sum of the mole fractions and multiply by 100 to obtain the molecular percentages as oxides.

Step 4: Multiply each molecular percentage by the decimal fraction of cations in the given oxide to obtain the atomic concentrations.

| Oxide | Specified Weight % | Normalized Weight % | Molecular Weight | Mole Fraction | Molecular Percentage | Cationic Fraction | Atomic Concentration Of Cation |
|---|---|---|---|---|---|---|---|
| $Li_2O$ | 0.01 | 0.01 | 29.88 | 0.00034 | 0.024 | 0.67 | 0.016 |
| $Na_2O$ | 0.96 | 0.99 | 61.98 | 0.01600 | 1.116 | 0.67 | 0.744 |
| $K_2O$ | 2.43 | 2.50 | 94.20 | 0.02654 | 1.854 | 0.67 | 1.236 |
| $MgO$ | 0.78 | 0.80 | 40.31 | 0.01985 | 1.387 | 0.50 | 0.694 |
| $CaO$ | 2.62 | 2.70 | 56.08 | 0.04815 | 3.364 | 0.50 | 1.682 |
| $Fe_2O_3$ | 7.76 | 8.00 | 159.70 | 0.05009 | 3.500 | 0.40 | 1.400 |
| $Al_2O_3$ | 17.85 | 18.40 | 101.96 | 0.18046 | 12.608 | 0.40 | 5.043 |
| $SiO_2$ | 61.00 | 62.89 | 60.09 | 1.04660 | 73.123 | 0.33 | 24.368 |
| $TiO_2$ | 0.62 | 0.64 | 79.90 | 0.00801 | 0.560 | 0.33 | 0.186 |
| $P_2O_5$ | 0.55 | 0.57 | 141.94 | 0.00402 | 0.281 | 0.29 | 0.080 |
| $SO_3$ | 2.43 | 2.50 | 80.06 | 0.03123 | 2.183 | 0.25 | 0.546 |
| Sum | 97.01 | 100.00 | | 1.43129 | 100.000 | | |

Calculation 6
Starting Resistivity Calculation

Using the % atomic concentrations from Calculation 3, use the following equations for calculation of fly ash resistivity (Bickelhaupt equations).

$$\rho_v = \exp[-1.8916 \ln X - 0.9696 \ln Y + 1.234 \ln Z + 3.62876 - (0.069078)E + 9980.58/T]$$

$$\rho_s = \exp[27.59774 - 2.233348 \ln X - (0.00176)W - (0.069078)E - (0.00073895)(W)\exp(2303.3/T)]$$

$$\rho_a = \exp[85.1405 - (0.708046) \, CSO_3 - 23267.2/T - (0.069078)E],$$

for $z < 3.5\%$ or $K > 1.0\%$ $$\rho_a = \exp[59.0677 - (0.854721) \, CSO_3 - 13049.47/T - (0.069078)E],$$

for $z > 3.5\%$ and $K < 1.0\%$ $$1/\rho_{vs} = 1/\rho_v + 1/\rho_s$$

$$1/\rho_{vsa} = 1/\rho_{vs} + 1/\rho_a$$

$\rho_v$ = volume resistivity (ohm-cm)

$\rho_s$ = surface resistivity (ohm-cm)

$\rho_a$ = adsorbed acid resistivity (ohm-cm)

$\rho_{vs}$ = volume and surface resistivity (ohm-cm)

$\rho_{vsa}$ = total resistivity (ohm-cm)

X = Li+Na     percent atomic concentration

Y = Fe     percent atomic concentration

Z = Mg+Ca     percent atomic concentration

K = K     percent atomic concentration

T = absolute temperature (K)

Calculation 6 (continued)

W = moisture in flue gas (volume %)

$CSO_3$ = concentration of $SO_3$ (ppm, dry)

E = applied electric field (kV/cm)

For the example case,

X = 0.016 + 0.744 = 0.76

Y = 1.40

Z = 0.694 + 1.682 = 2.376

K = 1.236

T = 417 (Example gas temperature 291°F.)

W = 6.983

$CSO_3$ = (from Calculation 2) 3.76 ppm, dry

E = 10 (typical electric field value)

$\rho_v$ = exp [-1.8916 ln (0.76) - 0.9696 ln (1.40) + 1.237 ln (2.376)
+ 3.62876 - (0.069078) (10) + 9980.58/417]

= 1.636 x $10^{12}$ ohm-cm $\rho_s$ = exp [27.59774 - 2.23348 ln (0.76) - (0.00176) (6.983)
- (0.069078) (10) - (0.00073895) (6.983) exp (2303.0/417)]

= 2.392 x $10^{11}$ ohm-cm $\rho_a$ = exp [85.1405 - (0.708046) (3.76) - 23267.2/417 - (0.069078) (10)]

= 1.939 x $10^{11}$ ohm-cm $1/\rho_{vs}$ = 1/1.636 x $10^{12}$ + 1/2.392 x $10^{11}$ = 4.792 x $10^{-12}$ Calculation 6 (continued)

$\rho_{vs} = 2.1 \times 10^{11}$ ohm-cm $1/\rho_{vsa} = 1/4.792 \times 10^{-12} + 1/1.939 \times 10^{11} = 9.949 \times 10^{-12}$ $\rho_{vsa} = 1.0 \times 10^{11}$ ohm-cm

Calculation 7

From Calculation 6, $$1/\rho_{vsa} = 1/\rho_{vs} + 1/\rho_a$$

where $\rho_{vsa} = 1 \times 10^{10}$ ohm-cm (the desirable $\rho$)

$\rho_{vs} = 2.1 \times 10^{11}$ ohm-cm (from Calculation 4)

$1/\rho_a = 1/\rho_{vsa} - 1/\rho_{vs}$ $= 1.0 \times 10^{10} - 2.761905 \times 10^{12}$ $= 9.5238 \times 10^{11}$ $\rho_{va} = 1.05 \times 10^{10}$ ohm-cm also from Calculation 6, $$\rho_a = \exp[85.1405 - (0.708046)CSO_3 - 23267.2/T - (0.069078)E]$$

where T = 417 (from Calculation 4)

E = 10 (from Calculation 4)

hence $1.06 \times 10^{10} = \exp[85.1405 - (0.708046)CSO_3$ $- 23267.2/417 - (0.069078)(10)]$ $\ln(1.05 \times 10^{10}) = 85.1405 - (0.708046)CSO_3 - 55.79664 - 0.69078$ $23.07464109 = 28.652 - (0.708046)CSO_3$ $(0.708046)\ CSO_3 = 5.578$ $CSO_3 = 7.878$ Correcting to wet conditions $SO_3$ needed $= 7.878 \times (39.286/42.235)$ $= 7.33$ ppm

Calculation 8

Rate of $SO_3$ Addition Calculation $SO_3$ from combustion calculation, Calculation 1, and background calculation, Calculation 2, = 0.00088 x 0.004 = 3.52 ppm (wet basis)

See Calculation 7 for desireable $SO_3$ level = 7.33 ppm

Difference = 7.33 − 3.52 = 3.81 ppm

Output to $SO_3$ control system

= 3.81 ppm

What is claimed is:

1. A process for treating fly ash found in flue gas resulting from the burning of coal to prevent rapping reentrainment of fly ash particles said process taking place in a system comprising plates of an electrostatic precipitator, an ESP inlet and an ammonia conditioning control system said process comprising adding ammonia to flue gas containing the fly ash particles and sulfur trioxide and with said ammonia being added in a stoichometric amount of one part or somewhat less of ammonia to one part of sulfur trioxide, such that rapping reentrainment of fly ash particles in the flue gas is prevented and wherein an optimum amount of ammonia to be added is determined by an algorithm which provides step 1) a value for $SO_3$ gas concentration assumed to be the optimum concentration for fly ash resistivity control, step 2) multiplying the $SO_3$ gas concentration of step 1 by the number n which has a value between 0.4 and 1.0 and step 3) outputting the calculated value to the ammonia conditioning control system to add ammonia to the system which ammonia along with sulfur trioxide in the said flue gas produce ammonium bisulfate which increases the cohesivity of fly ash on the plates of said electrostatic precipitator.

2. The process of claim 1 wherein the sulfur trioxide results from the burning of the coal.

3. The process of claim 1 wherein the sulfur trioxide results from the burning of coal plus the extrinsic addition of sulfur trioxide.

4. The process of claim 1 wherein there is provided a $SO_3$ conditioning system and wherein the amount of sulfur trioxide present in the flue gas is determined by an algorithm.

5. The process of claim 1 wherein sulfur trioxide results from the conversion of sulfur dioxide in a selective catalytic reactor for $NO_x$ control.

6. A method for adding optimum amounts of ammonia to flue gas containing fly ash resulting from the burning of coal to enhance electrostatic particle separation from the flue gas or to reduce $SO_3$ in the flue gas comprising applying the steps of the following algorithm, Step 1. Determine flue gas $SO_3$ concentration, assumed to be an optimum concentration for fly ash resistivity control, or the higher value for $SO_2$ to $SO_3$ conversion in an SCR (Selection Catalytic Reactor) for $NO_x$ Control, Step 2. Multiply the $SO_3$ concentration from Step 1 by the number, n, with a value between 0.4 and 1.0, the exact value of n is determined by trial and error, and Step 3. Output the calculated value to the ammonia conditioning control system.

7. A method for adding optimum amounts of ammonia to flue gas containing fly ash resulting from the burning of coal to condition an electroprecipitator system having an $SO_3$ flue gas conditioning system in order to enhance electrostatic particle separation from the flue gas or to reduce $SO_3$ emissions comprising applying the steps of the following algorithm, 1) Combustion calculation to determine the $SO_2$ concentration in flue gas, 2) Multiply the $SO_2$ concentration of step 1 by the number 0.004 for Eastern and Western Coals; or multiply the $SO_2$ concentration by 0.001 for Powder River Basin Coal, 3) Add to the number of step (2) any $SO_3$ added to the flue gas by the $SO_3$ flue gas conditioning systems and 4) Add to the number of step 2 and step 3 arty $SO_3$ from conversion of $SO_2$ in a SCR, 5) Multiply the number in step (4) by a number in the range of 0.4-0.7.

8. A method for adding optimum amounts of ammonia to flue gas resulting from the burning of coal to condition an electroprecipitator to enhance electrostatic particle separation from the flue gas comprising applying the steps of the following algorithm to the system, Step 1.
a. Measure or calculate the flue gas $SO_3$ concentration;
b. Observe and record the instantaneous opacity of the flue gas leaving the electrostatic precipitator, Step 2. Multiply the $SO_3$ concentration from Step 1 by the number, n, with a value between 0.4 and 1.0 with the exact value of n determined by an iterative process (see Step 4), Step 3. Physically set the controlled parameter to the value identified in Step 2, Step 4. Repeat the Step 1 measurements to verify that the process is operating in the desired manner.

9. The method of claim 4 wherein the $SO_3$ concentration in flue gas is determined by the following algorithm, Referring to Appendix A:
(Procedure with no ESP Feedback)

1. "Typical" Starting Conditions:
    low flue gas $SO_3$, concentration measured at the ESP inlet—0 to 4 ppm $SO_3$
    moderate to high fly ash resistivity—$8 \times 10^{10}$ ($8 \times 10E10$) ohm-cm to $5 \times 10^{12}$ ($5 \times 10E12$) ohm-cm
    low ESP power level characterized by low average current densities—see Table 1, Appendix A.

2. Desired "End" Conditions:
    increased flue gas $SO_3$, measured at ESP inlet—from 2 to 12 ppm, depending on flue gas temperature and fly ash composition
    optimum fly ash resistivity—$8 \times 10_9$ ($8 \times 10E9$) ohm-cm to $4 \times 10^{10}$ ($4 \times 10E10$) ohm-cm, depending on ESP collection and reentrainment characteristics
    high ESP power levels as indicated by current density levels—again, see table Appendix A.

3. Calculation to determine die level of $SO_3$ injection needed to produce optimum fly ash resistivity and, hence, optimum level of flue gas $SO_3$, Step 1.
1. Determine the temperature of the flue gas entering the ESP,
2. Obtain coal approximate ultimate analysis and fly ash mineral analysis.

Step 2.
Estimate $SO_3$ background level of $SO_3$ in the flue gas using correlation relating flue gas $SO_3$ to coal type and coal sulfur content.

Step 3.
Calculate the base ash resistivity using empirical equations relating ash resistivity to ash composition, flue gas moisture and flue gas temperature; the Bickelhaupt equations are an example of relationships that can be used for this calculation. See Calculation 3 and Calculation 4.

Step 4.
Use a correlation relating the base fly ash resistivity and flue gas $SO_3$ concentration to determine the flue gas $SO_3$ concentration needed to produce the optimum fly ash resistivity; examples of correlation relating base fly ash resistivity and flue gas SO$_3$ to actual resistivity are procedures given by Bickelhaupt and by McCain.

See Calculation 5.

Step 5.

Subtract the background SO$_3$ concentration from the needed SO$_3$ concentration that must be added to the flue gas to produce the optimum fly ash resistivity. See Calculation 6.

Step 6.

Send rate of addition signal to the controls that operate the SO$_3$ conditioning system.

10. The method of claim 4 wherein the SO$_3$ concentration in the flue gas is determined by the following algorithm, Referring to Appendix A:
(Procedure with ESP Feedback)

1. "Typical" Starting Conditions:
   low flue gas SO$_3$ concentration measured at the ESP inlet—0 to 4 ppm SO$_3$ moderate to high fly ash resistivity—8×10$^{10}$(8×10E10) ohm-cm to 5×10$^{12}$ (5×10E12) ohm-cm.
   low ESP power level characterized by low average current densities—see table Appendix A.

2. Desired "End" Conditions:
   increased flue gas SO$_3$ measured at ESP inlet—from 2 to 12 ppm, depending on flue gas temperature and fly ash composition
   optimum fly ash resistivity—8×10$^9$(8×10E9) ohm-cm to 4×10$^{10}$ (4×10E10) ohm-cm, depending on ESP collection and reentrainment characteristics
   high ESP power levels as indicated by current density levels—again, see table Appendix A.

3. Calculation to determine the level of SO$_3$ injection needed to produce optimum fly ash resistivity and, hence, optimum level of flue gas SO$_3$.

Step 1.
   Obtain coal approximate ultimate analysis and fly ash mineral analyses (see Table 2).

Step 2.
   Determine the temperature of the flue gas entering the ESP,

Step 3.
   Estimate SO$_3$ background level of SO$_3$ in the flue gas using correlation relating flue gas SO$_3$ to coal type and coal sulfur content, Step 4.
   Measure the current levels in each field of the ESP and calculate the corresponding current densities, Step 5.
   Determine effective fly ash resistivity level in the ESP using a correlation that relates fly ash resistivity to ESP current density for each electrical field in the direction of gas flow, and if this resistivity is close to the optimum range, go to Step 10, otherwise proceed to Step 6, Step 6.
   Use a correlation relating fly ash composition and flue gas temperature and SO3 concentration to fly ash resistivity to determine the flue gas SO$_3$ concentration needed to produce the optimum fly ash resistivity, Step 7.
   Subtract the background SO$_3$ concentration from the needed SO$_3$ concentration determined in Step 3 to determine the amount of SO$_3$, that must be added Lo the flue gas to produce the optimum fly ash resistivity, Step 8.
   Send rate of addition signal to the controls that operate the SO$_3$ conditioning system, Step 9.
   Repeat Steps 4 and 5.

Step 10.
   1. a. If indicated ash resistivity is equal to or less than optimum resistivity, decrease rate of injection by x percent where x is between 5 and 25, or
      b. If indicated ash resistivity is greater than optimum resistivity, increase rate of injection of x percent where x is between 5 and 25, Step 11.
   Repeal Step 10 until indicated fly ash resistivity passes through optimum resistivity point and then set rate of injection at a point in the range bounded by the levels calculated at a point that is halfway between the two levels, Step 12.
   Every y minutes, where y is number between 5 and 30, restart the process beginning at Step 2.

* * * * *